United States Patent Office 3,562,137
Patented Feb. 9, 1971

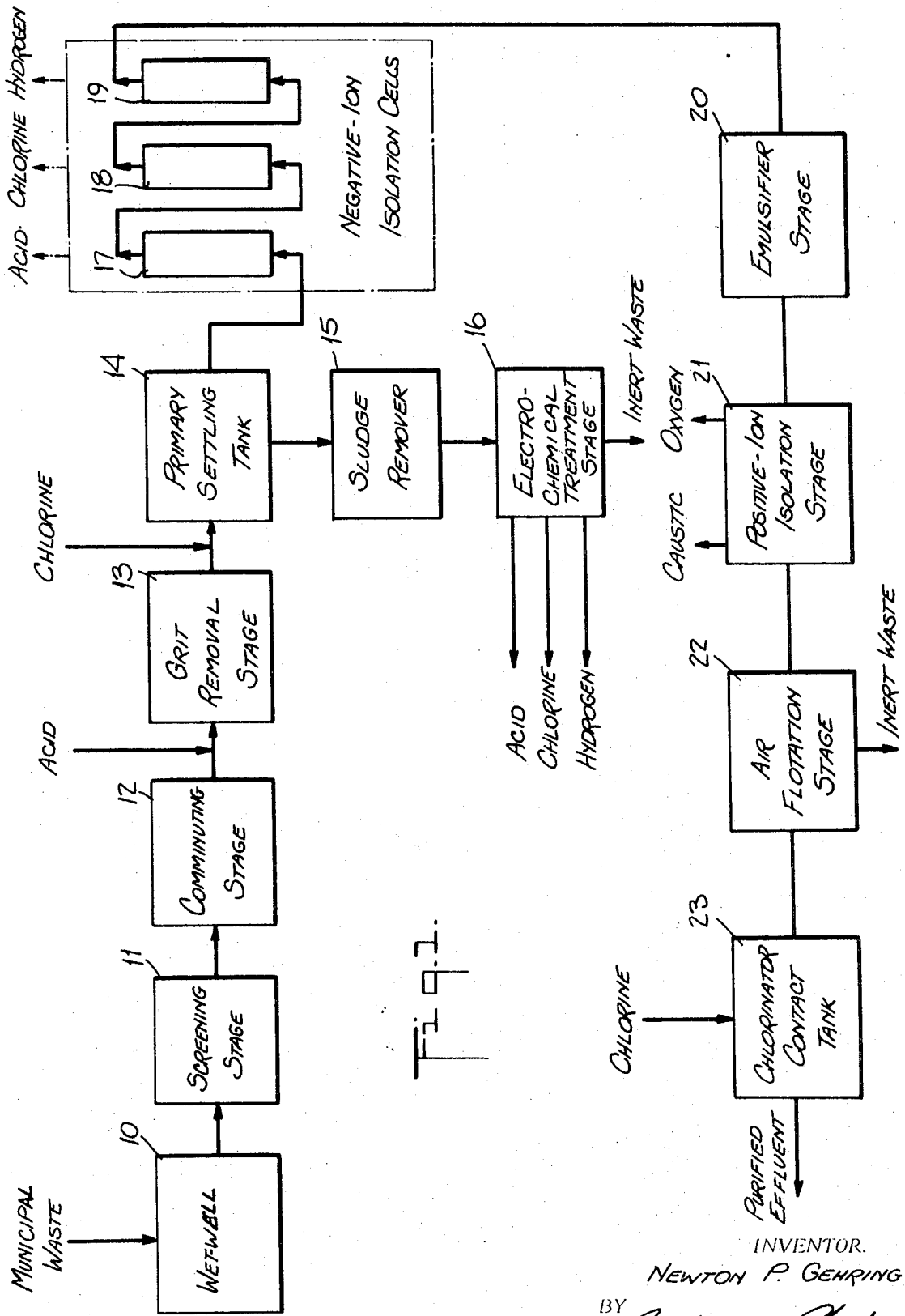

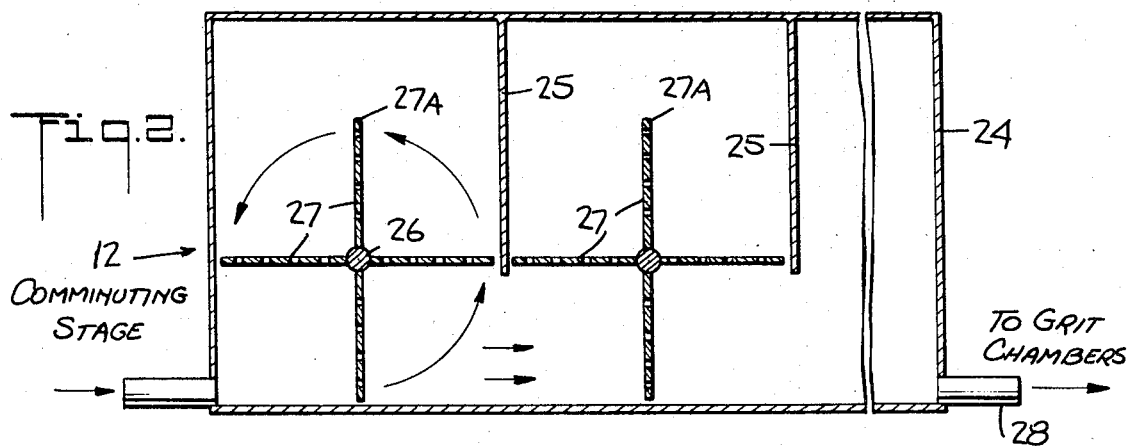
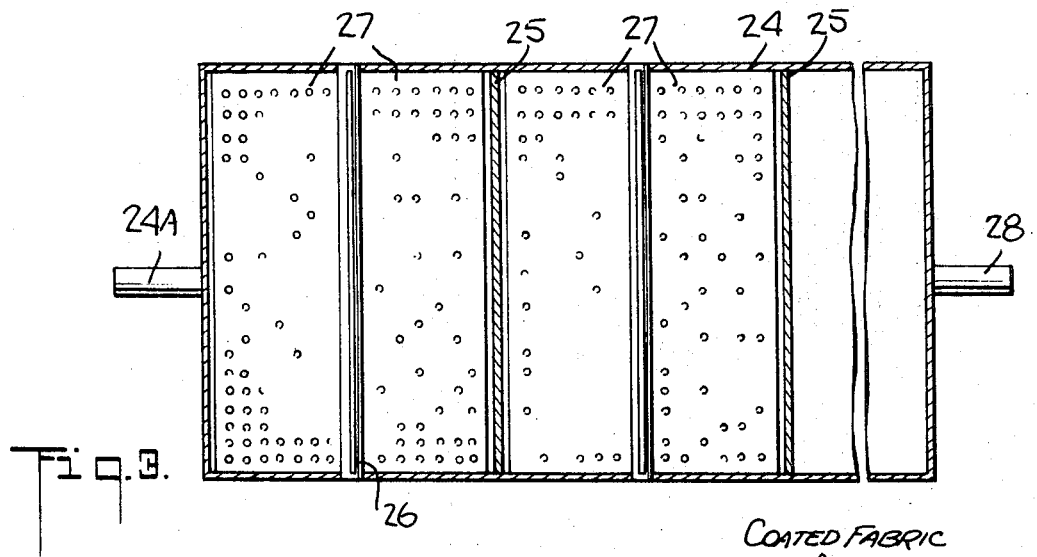
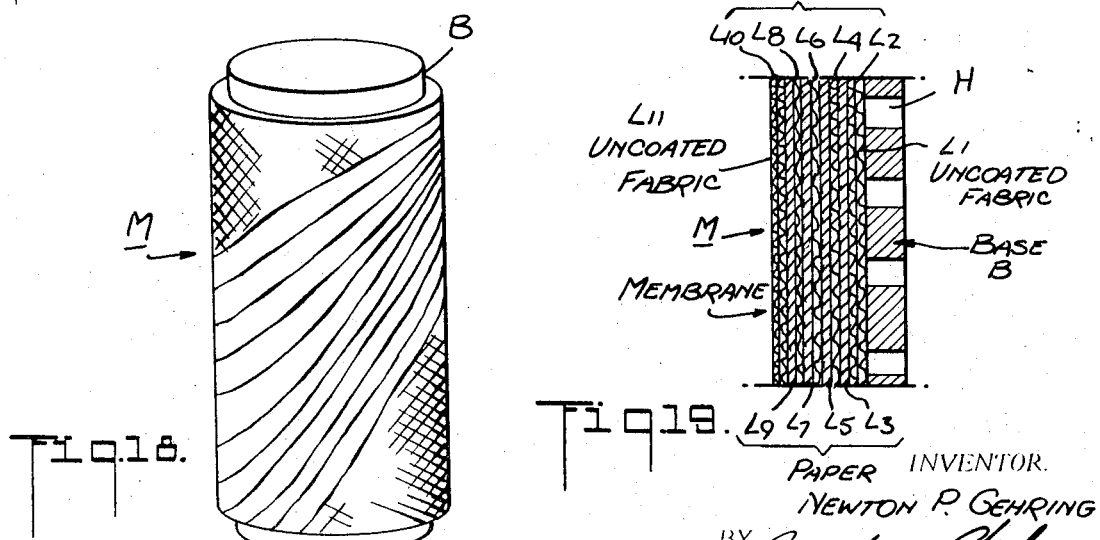

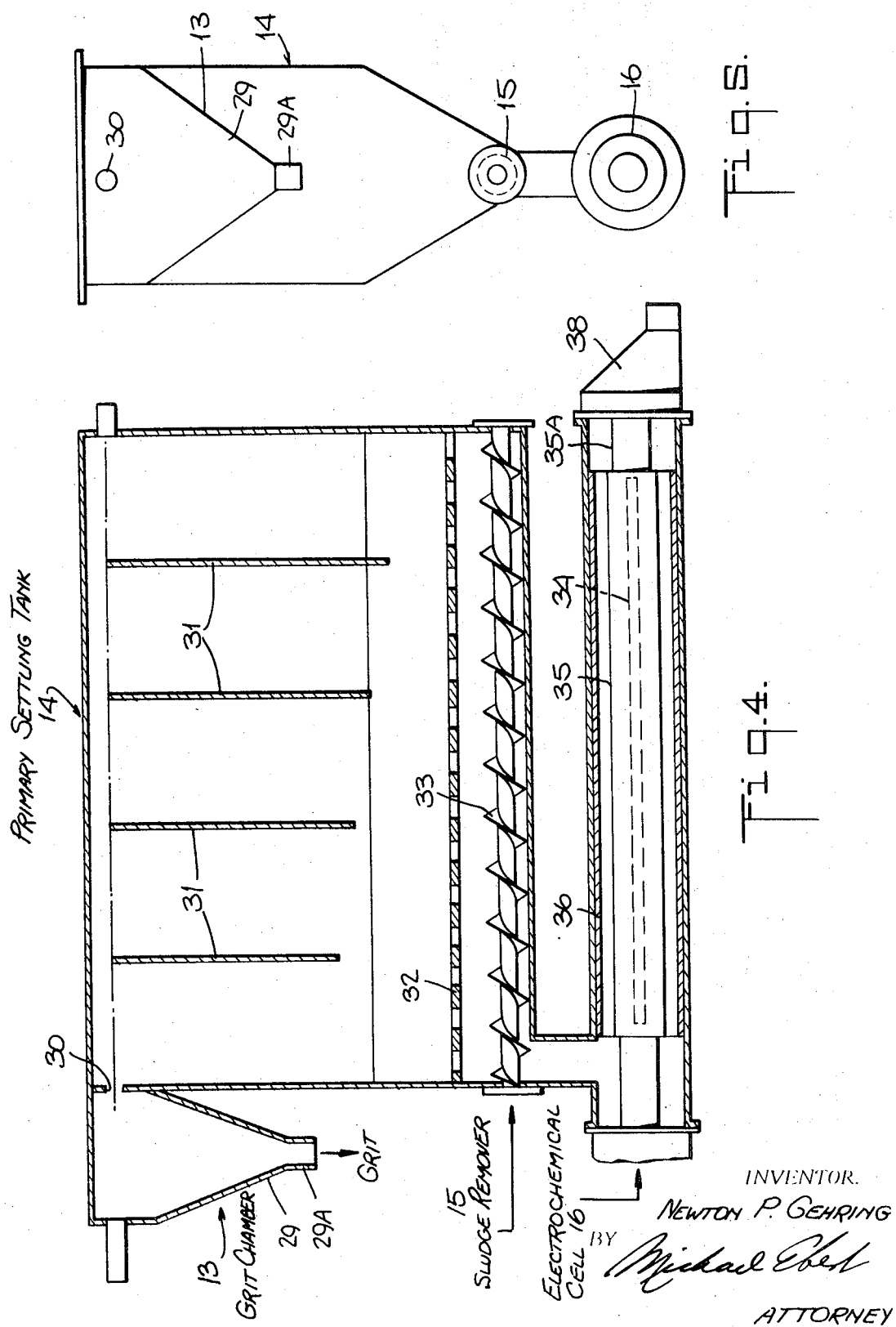

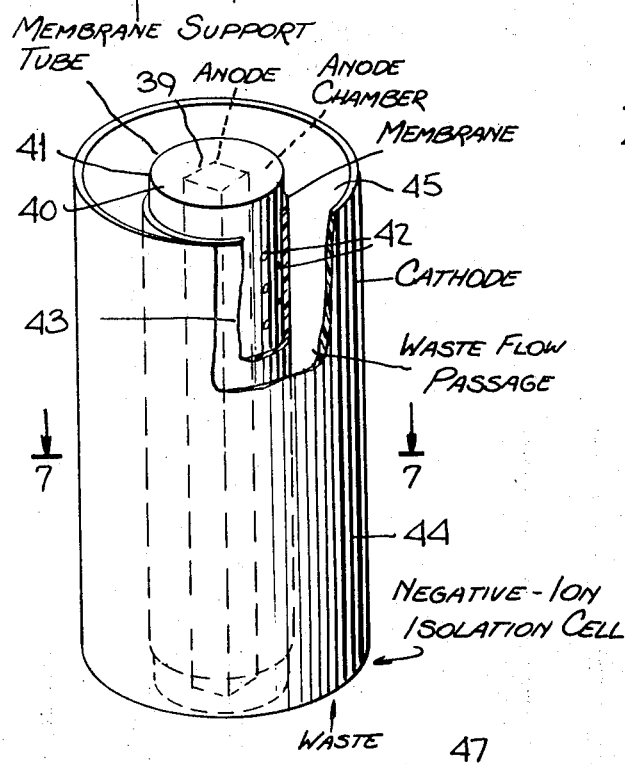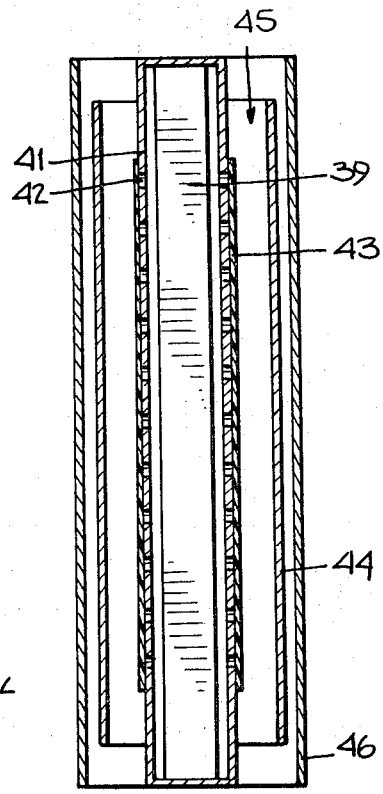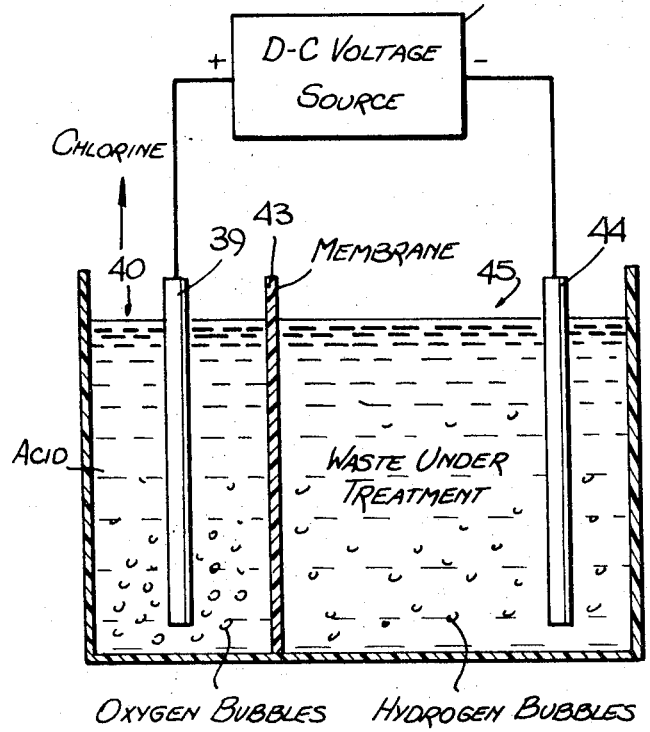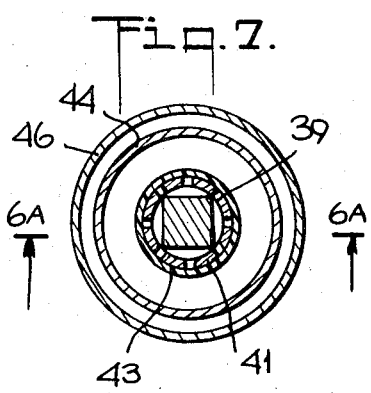

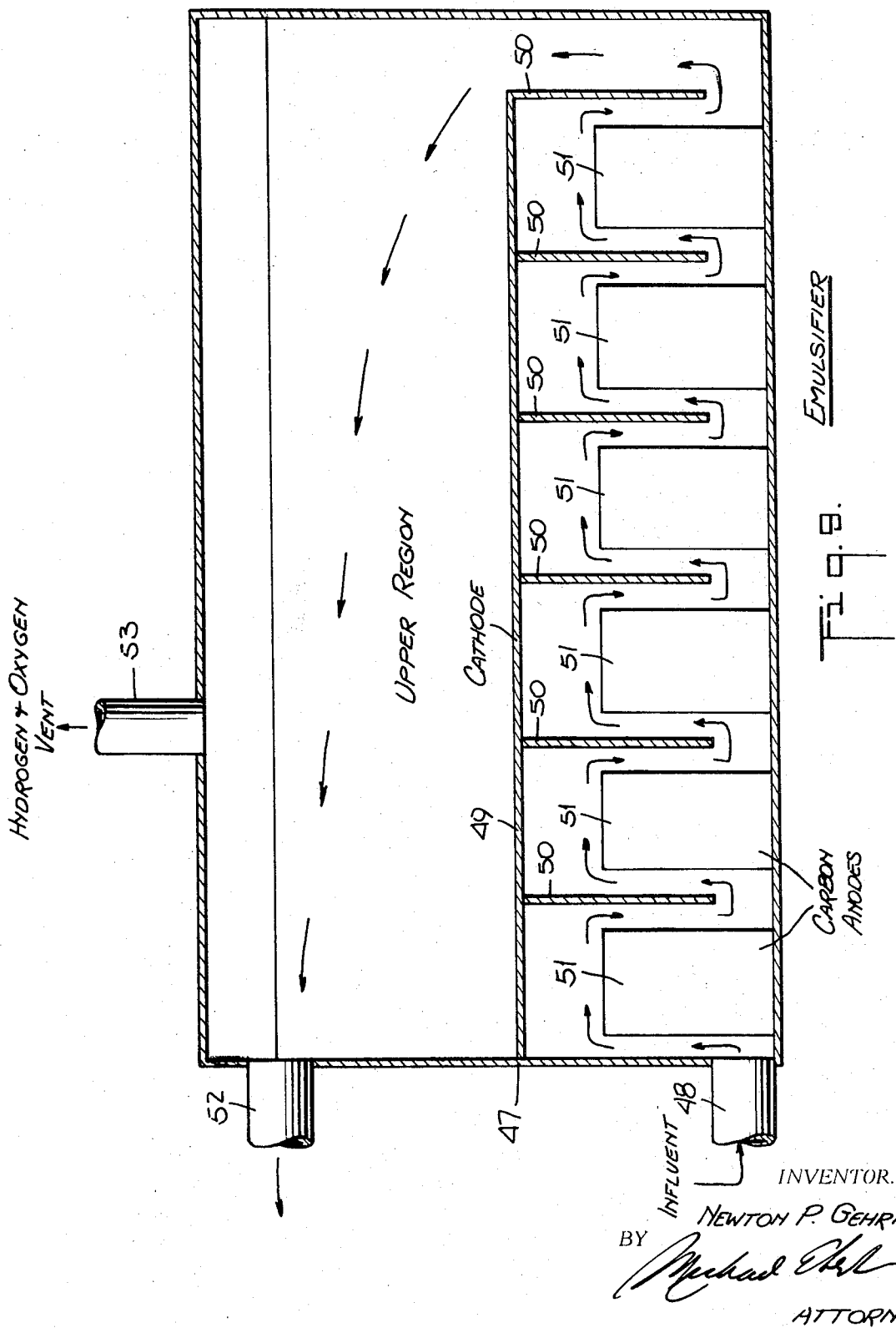

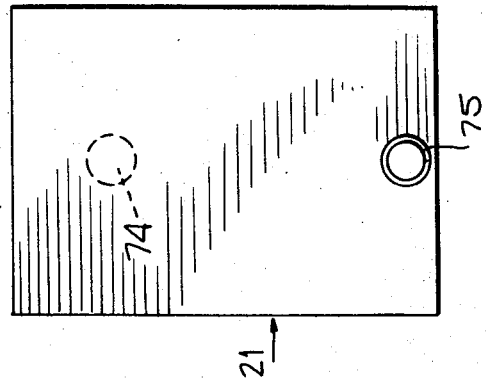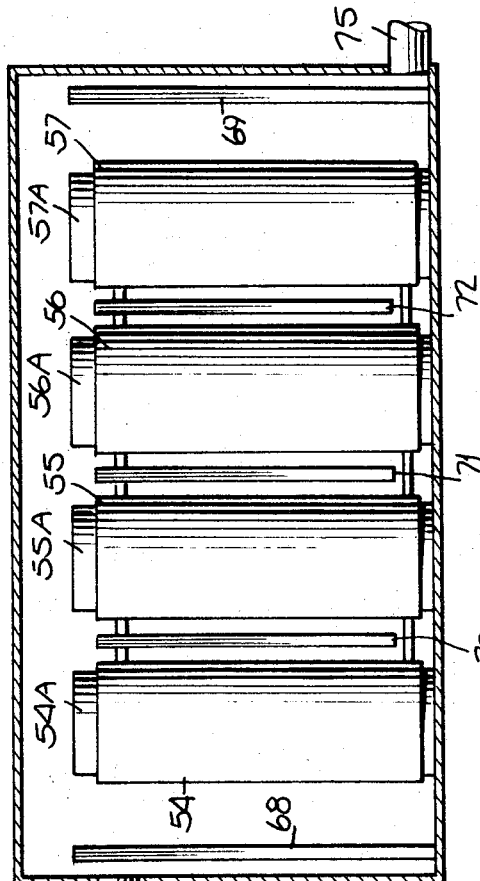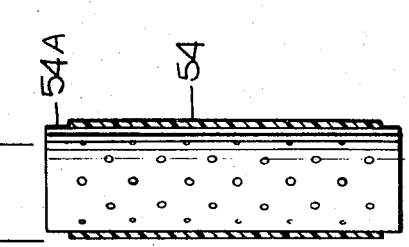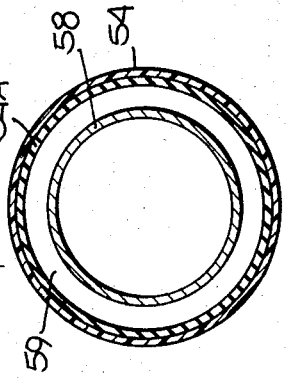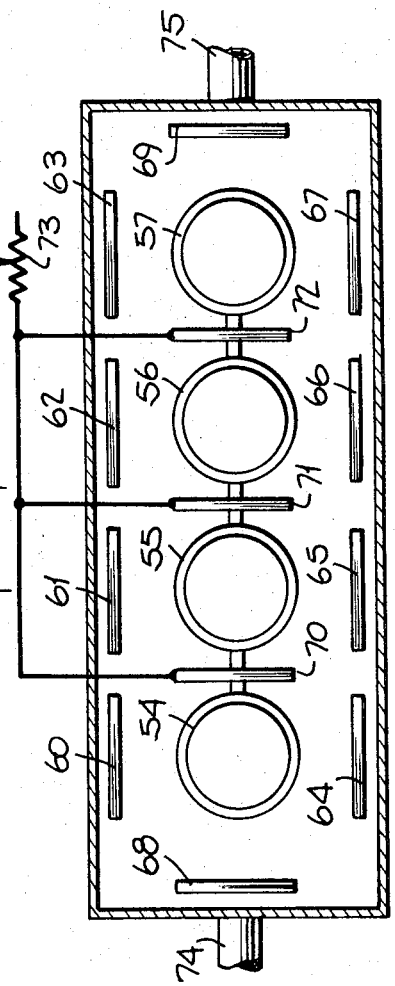

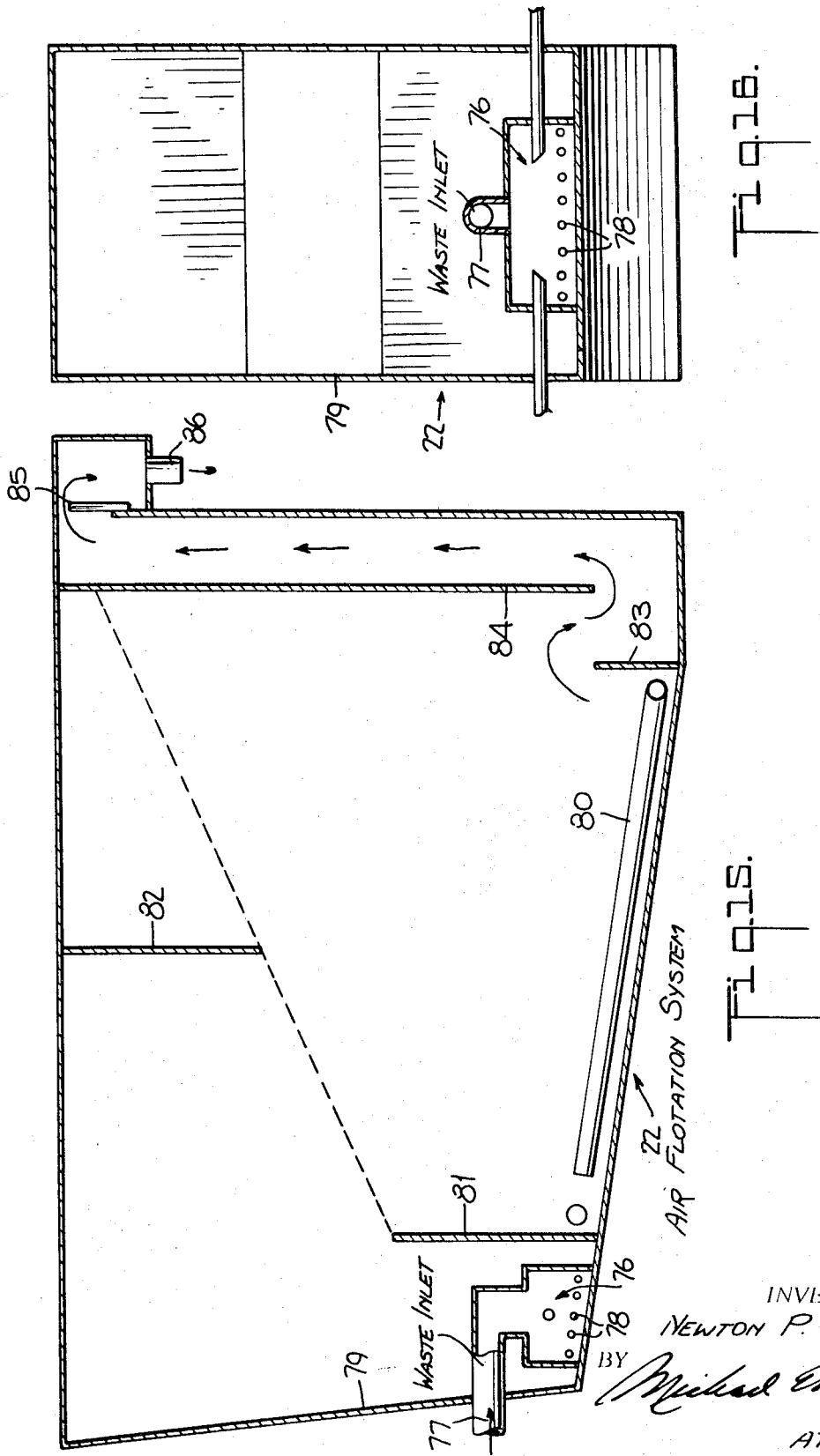

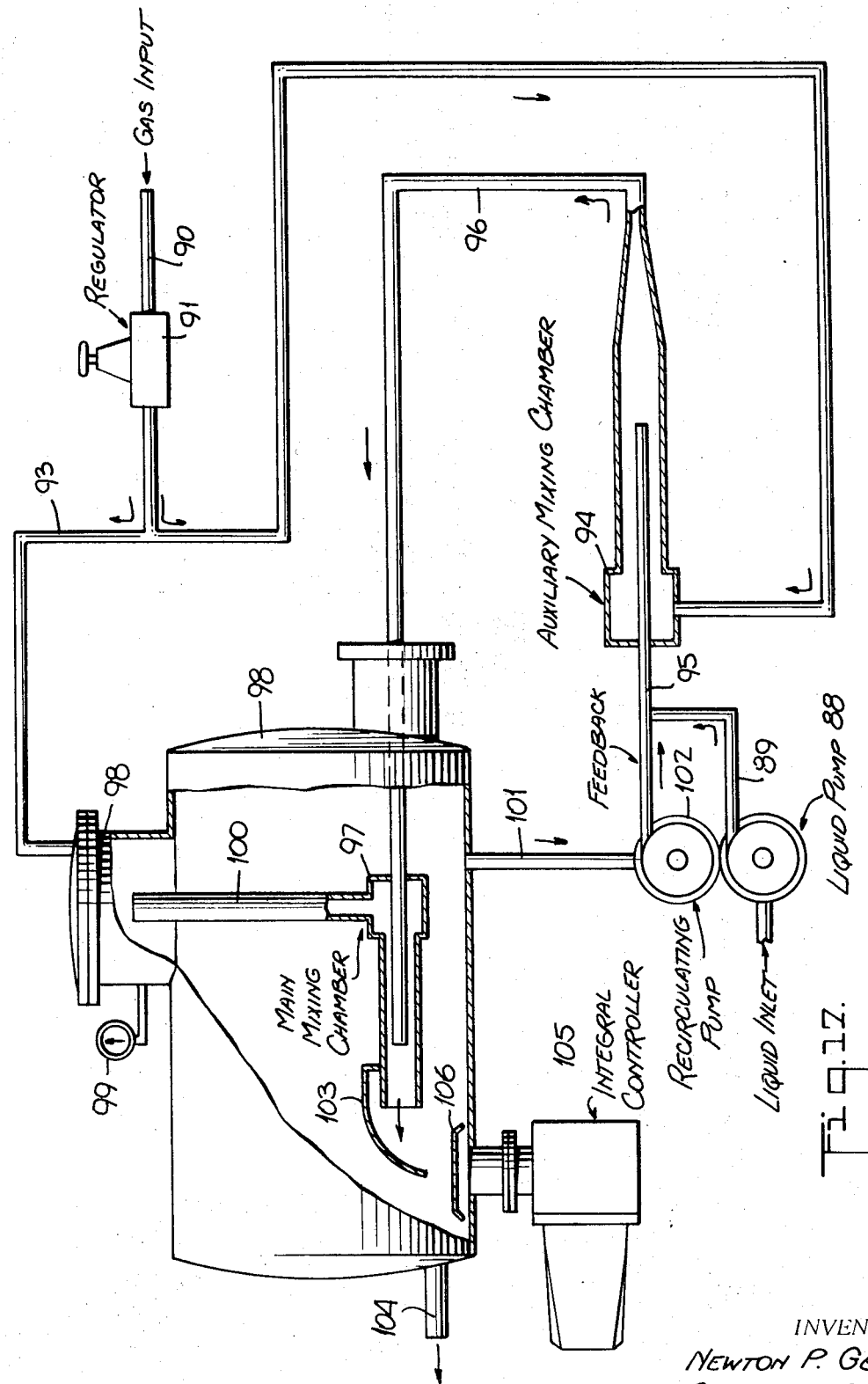

3,562,137
SYSTEM FOR ELECTROCHEMICAL WATER TREATMENT
Newton P. Gehring, Largo, Fla., assignor to Fischer & Porter Co., Warminster, Pa., a corporation of Pennsylvania
Filed Jan. 22, 1968, Ser. No. 699,415
Int. Cl. B01d 13/02; B01k 3/00
U.S. Cl. 204—258    15 Claims

ABSTRACT OF THE DISCLOSURE

An electrochemical technique for water-purification and waste-water treatment, in which waste water containing dissolved and suspended organic and inorganic matter is fed into one or more negative-ion isolation electrodialysis cells, each of which includes an anion-permeable membrane surrounding an anode. The cells are serially arranged and act to increase the pH factor of the waste water in a stepwise manner to an extent causing pH-sensitive salts to precipitate, dissolved constituents being demineralized and organic matter being oxidized. Electrodialysis is accompanied in the cell by electrolysis, causing hydrogen and oxygen bubbles to evolve, the hydrogen bubbles effecting coagulation and flotation of the suspended and precipitated matter and at the same time scavenging the outer surface of the membrane to prevent fouling and scaling thereof, the inner surface being scavenged by the oxygen bubbles.

The outflow of the negative-ion cells is supplied to a positive-ion isolation chamber provided with cation-permeable membranes. This chamber, through the combined action of electrodialysis and electrolysis, functions to decrease the pH factor of the waste water, as well as to further oxidize organic matter, oxygen and hydrogen bubbles generated therein serving to scavenge the surfaces of the cation-permeable membranes. The output of the positive-ion chamber is supplied to an air-flotation unit or other means to separate the coagulated and suspended solids from the ion-treated water, thereby yielding purified water.

This invention relates generally to water-purification and waste-water treatment, and in particular to an electrochemical system adapted to remove substantially all impurities from waste water efficiently and at relatively low cost.

The disposal of domestic and industrial water-borne wastes constitutes a major problem. While many techniques have heretofore been proposed to solve this problem, they are usually costly to construct and to operate. By far the cheaper practice is to discharge untreated wastes into rivers, lakes, streams, and other receiving waters. However, the savings effected by such dumping are illusory, for the resultant pollution of our seemingly endless supply of water has had grave economic and social consequences which have become a matter of national concern.

Thus water supplies and bathing places have been contaminated by untreated water wastes. Food fish, shellfish layings, and other valuable forms of aquatic life have been destroyed, and the usefulness of natural waters for recreation, commerce and industry, has been seriously impaired.

Municipal sewage generally includes both domestic and industrial waste. Domestic sewage is household waste derived from kitchens, toilets and bathrooms, and in addition to mineral and organic matter already present in the water dispensed to the community, it contains an imposed burden of human excrement, paper, soap and detergent, dirt, grease, garbage, and numerous other substances. Some of these wastes are carried in suspension, others are taken into solution, while still others are so finely divided that they possess colloidal properties.

A considerable portion of domestic waste is organic in nature and because of its high energy value it is subject to attack by saprophytic micro-organisms. Domestic sewage is therefore unstable and putrescible, and gives rise to offensive odors, notably those of hydrogen sulfide, and other objectionable conditions associated with decomposition or organic matter. Moreover, pathogenic organisms are always potentially present in domestic sewage and render it highly dangerous.

The character of industrial wastes depends on the processes in which they originate. Consequently such wastes vary in nature and may be laden with inorganic as well as organic substances. The untreated discharge of the waste waters of certain industries has been known to cause more serious difficulties than those arising from domestic sewage produced in the community in which the industries are located. Toxic metals and chemical industrial wastes may destroy the biological activity of streams and of municipal sewage-treatment works, and render receiving waters unfit for further use. In the manufacture of organic chemicals, the wastes may impart to the receiving waters tastes and odors almost impossible to remove. Strong acids and alkalis may render receiving waters corrosive, while suspended solids may settle in receiving waters and smother aquatic life.

Biological oxidation techniques are commonly used in municipal waste-disposal facilities. These ordinarily take the form of trickling filters or activated sludge systems. Biological reactions are similar to other chemical reactions save that they occur as a natural part of the cell's metabolic cycle and involve enzymes. In bio-oxidation, organics are rendered soluble in the cell wall by enzyme action and are converted within the cell in combination with oxygen to cell matter, energy, and waste products which are expelled. At the same time, some solubles and colloids may be absorbed in the biological floc.

Biological oxidation facilities are relatively inexpensive in operation and reasonably satisfactory for the removal of most organics. In the case of activated sludge systems, these are more costly to operate than a trickling filter plant, for the cost of supplying air for diffusion (electrical costs plus equipment) is substantial, as well as the cost of recirculating sludge. However, there are many negative factors, such as difficulty of control, poisoning of the biology, and inability to remove certain classes of organics and inorganics. Also, because bio-oxidation systems involve bacterial growth, such systems require a prolonged conditioning period before they become fully operative. They are therefore incapable of intermittent or occasional operation, as may be required to treat batch loads of waste water. Also, while conventional biological processing is capable of reducing the bacteria content and making the water clear, it does not eliminate the fertilizing elements of the sewage (phosphorous and nitrogen compounds), and the resulting growth of algae.

Another serious shortcoming of bio-oxidation systems is that it is not possible, without careful controls, to pretreat the influent with acids or other chemicals in order to minimize the production of offensive odors in the incoming wastes, for such pre-treatment may destroy the foculative bacteria of both the anaerobic and aerobic varieties in the wastes which are vital to the bio-oxidation process. Hence bio-oxidation techniques are not compatible with the high dosages of acid, chlorine and other chemicals which might otherwise be useful in the sewerage system feeding the treatment plant.

Since the secondary effluent of a biological oxidation system contains dissolved inorganic solids or minerals, it has heretofore been proposed to use electrodialysis to effect demineralization thereof to permit reuse of the water or before discharging the effluent into receiving waters. In electrodialysis, a direct-current voltage impressed across the electrodes of a cell containing mineralized water will cause positively charged ions (cations) to migrate to the cathode, and negatively charged ions (anions) to migrate to the anode. By placing cation and anion-permeable mebranes alternately between the anode and cathode electrodes, alternate compartments or chambers become more concentrated, while intervening water compartments become diluted.

Because of the many practical difficulties which have been encountered in electrodialysis, the exploitation of this useful technique has been limited. With conventional units, it is usually necessary to filter out suspended organic solids from the secondary effluent before it is fed into the electrodialysis stack. In many instances it is also the practice to first remove dissolved organics by adsorption towers. Moreover, pH changes which occur in electrodialysis may induce precipitation of pH-sensitive salts, such as calcium carbonate, which in turn may cause scaling of the membrane and obstruction of flow channels in multiple-chamber units.

Another effect common to all conventional electrodialysis units is membrane fouling which entails the deposition of materials on the dilute side of the membrane. In waste-water treatment, fouling appears to be due to electro-phoretic movement of negatively-charged colloidal particles to the anion membranes. Because of the size of the particles, they cannot move through the membrane and instead form a layer at the membrane surface that interferes with demineralization.

With a view to reducing scaling and fouling, attempts have hitherto been made to impart high velocities to the water being treated in the dialysis stack in order to prevent material from clinging to the membrane surfaces, but this acts to lower the residence time of the solution in contact with the membrane surface; hence it cuts down the degree of demineralization.

Accordingly, it is the main object of this invention to provide a novel electrochemical technique for water purification and waste-water treatment, which is adapted to remove substantially all impurities from the water efficiently and economically.

The distinction between water-purification and waste-water treatment is not a matter of principle but merely of degree, the invention being capable of functioning effectively either with an influent relatively free of suspended solids or with a highly-contaminated influent which is virtually in the raw state.

More specifically, it is an object of this invention to provide a technique in which electrodialysis is used for secondary rather than tertiary treatment, thereby dispensing with bio-oxidation and making it possible to introduce acids, chlorine, and other oxidizing chemicals in inflowing waste products to reduce odors and other unpleasant conditions without interfering with the operation of the secondary system, as would be the case with bio-oxidation treatment. Thus the nature of the electrochemical secondary treatment is such as to make possible an overall improvement in the sewage disposal system and in many instances to obviate the need for tertiary treatment.

A salient advantage of the invention is that the electrochemical system is generally self-sufficient and functions to generate substantial quantities of acid and chlorine for acidification and chlorination, in order to increase particle density, to promote coagulation and to minimize the production of noxious odors.

In contradiction to bio-oxidation secondary-treatment systems, the present invention is rendered immediately effective when operating voltage is applied, the system being capable of trouble-free continuous operation or of occasional operation to cope with batch loads of waste water. The system is therefore usable for reserve or emergency purposes, for it requires no pre-conditioning to take effect. Moreover, the electrodialysis system is relatively compact and lends itself to mobile installations or to installations where space is so limited as to preclude standard waste-treatment systems of the bio-oxidation type.

Also an object of the invention is to provide an electrodialysis technique of the above type, in which the negative and positive isolation cells are isolated serially from each other, the negative isolation cells yielding, by extraction of anions from the waste, an acid solution, the positive isolation cells yielding, by extraction of cations from the waste, a caustic solution, these solutions affording in many instances valuable by-products.

A highly significant improvement gained by serially isolating the negative and positive ion cells in the electrodialysis techniques according to the invention, is that this permits electrolysis, which in ordinary units is regarded as a drawback. In a conventional electrodialysis arrangement, the negative and positive compartments are segregated by a dilute liquid compartment having a relatively low electrical conductivity, whereas in the present invention, the dilute compartment is eliminated, thereby creating a highly conductive electrolytic path between anode and cathode, giving rise, with proper application of direct-current, to heavy dissociation of water and the generation of either hydrogen or oxygen in the outer membrane region through which the waste water flows, depending on whether the cell is of the negative or positive-ion type.

The evolved gas in the cell functions not only to effect flotation of precipitated and oxidized matter, but acts also to sweep the surfaces of the membrane and scavenge material therefrom to prevent fouling and scaling. Thus the hybrid electrodialysis-electrolysis system is capable of operating at high efficiency for an indefinite period without maintenance.

Another advantage of the invention is that the ion isolation cells provide a galvanic action which materially reduces the power requirements of the hybrid system, making possible low-cost operation.

Briefly stated, these objects are attained in a water-purification and waste-water treatment system in which grit and other inert matter are first removed from the raw sewage, after which the waste water is fed to a settling tank from which sludge is withdrawn and electrochemically treated, the partially-clarified waste water then being fed into a series of negative-ion isolation electrodialysis cells, each of which includes an anion-permeable membrane surrounding an anode.

The waste water is conducted through a flow passage defined by the outer surface of the anion-permeable membrane and a cathode encircling the membrane, each cell acting incrementally to step up the pH factor of the waste water and thereby causing pH-sensitive salts to precipitate, other dissolved constituents being removed by demineralization and organic matter being oxidized by electrolytic action. Electrodialysis is accompanied in each negative-ion cell by electrolysis, causing hydrogen and oxygen bubbles to evolve which serve to sweep or scavenge the surfaces of the membrane to prevent fouling and scaling thereof, the hydrogen bubbles also effecting flotation of the oxidized and precipitated matter.

The treated output of the negative-ion cells is conducted to a positive-ion isolation unit in which one or more cation-permeable membranes surround a cathode, the incoming waste water being supplied to a region defined by the outer surface of the membranes and one or more anodes spaced therefrom, the positive-ion unit acting to decrease the pH factor of the water as well as to demineralize dissolved matter and oxidize organic material. In the positive-ion unit, oxygen and hydrogen evolved by electrolysis serves to scavenge the surfaces of the cation-permeable membrane to prevent fouling and scaling thereof. The treated outflow of this unit is supplied to an air flotation stage or other standard means to separate the coagulated suspended solids from the treated waste water.

The chlorine as well as the hypochlorous and other acids generated in the negative-ion cells are used in various stages of the system for acidification and chlorination, whereby the system is self-sufficient.

For a better understanding of the invention, as well as other objects and further features thereof, reference is made to the following detailed description to be read in conjunction with the accompanying drawings, wherein:

FIG. 1 is a block diagram of an electrochemical system in accordance with the invention, for treating waste water;

FIG. 2 is a side view of a preferred embodiment of a comminuter;

FIG. 3 is a plan view of one of the rotary blades in the comminuter shown in FIG. 2;

FIG. 4 is a side view of preferred forms of grit removal, primary settling, sludge-removal, and sludge-treatment stages of the system;

FIG. 5 is an end view of the structures shown in FIG. 4;

FIG. 6 is a perspective view of one of the negative-ion isolation cells in accordance with the invention, the walls of the cells being partially cut away to expose the interior thereof;

FIG. 6A is a longitudinal section taken through the cell;

FIG. 7 is a transverse section taken through the cell;

FIG. 8 is a schematic illustration of a negative-ion isolation cell;

FIG. 9 schematically shows a preferred form of emulsifier;

FIG. 10 is a side view of the positive-ion isolation unit;

FIG. 11 is a plan view of the positive-ion isolation unit;

FIG. 12 is a transverse section taken through one of the membranes of the position-ion unit;

FIG. 13 is an end view of the positive-ion unit;

FIG. 14 is an elevational view of one of the positive-ion membranes;

FIG. 15 is a somewhat schematic elevational view of a preferred embodiment of an air-flotation unit;

FIG. 16 is a side view of the air-flotation unit;

FIG. 17 is an air-bubble generator for use in conjunction with the air-flotation unit;

FIG. 18 is a perspective view of a preferred form of electrodialysis membrane; and FIG. 19 is a sectional view of the membrane shown in FIG. 18.

GENERAL DESCRIPTION OF WASTE-WATER TREATMENT SYSTEM

In this section of the specification, the main stages of the system and the manner in which they operate and are coordinated will be described in general terms, while in subsequent sections, certain stages of the system which incorporate novel features will separately be considered in greater detail.

Referring now to FIG. 1, there is shown a wet well 10, for receiving water-borne waste from a sewerage system or other sources. While the invention will be described herein as it functions in treating municipal sewage which combines both domestic and industrial wastes, it is to be understood that the invention may be used for handling other and more limited problems, such as the waste output of a paper mill or chemical plant, in which event one may dispense with some or all of the stages which precede the electrodialysis system. In some instances, one may even dispense with the positive-ion or the negative stops of the electrodialysis system, where for example the incoming material is initially highly caustic or acid.

Sewage contains mineral and organic matter in a dissolved or suspended state, some of the suspended matter being settleable, the remainder unsettleable. The condition of sewage at the outfall of the sewerage system is a function of the time of travel in the collecting system and the temperature of the sewage. Sluggish flow and high temperature conditions tend to decrease the freshness of sewage, and as decomposition becomes more active, the sewage becomes stale and may become septic. Septic sewage has a foul odor, its color is dark, and the floating and suspended solids are disintegrated. Since the present invention makes possible rapid and continuous treatment, as well as chemical pre-treatment, the sewage, after arrival at the plant, is not permitted to become septic.

Where septic conditions tend to develop at some point in the sewage collecting network, such as at a pumping station, one may, when the collecting network is used in conjunction with an electrochemical system of the type disclosed herein, install negative-ion cells at the pumpign station. These cells are arranged to treat a portion of the waste at the pumping station to generate chlorine and acid for treatment of the sewage at that point, thereby inhibiting septic activity. In this way, the problem of corrosion in collecting lines carrying septic fluid is eliminated.

The first step in treatment involves a screening stage 11, wherein floating and suspended matter whose dimensions are larger than the openings of the screening device are strained out and removd for disposal. Racks, bar screens or perforated plates are provided to catch sticks, leaves, and other rough debris. Rackings and screenings are removed from racks and screens for disposal by burial, incineration or digestion, including composting. The racks and screens serve to protect the treatment system against trash or other clogging matter.

The water-borne waste material is then fed into a shredding or comminuting stage 12, converting coarse matter into fine matter which may be subsequently removed by sedimentation. Such cutting devices may take the form of revolving, slotted drums equipped with cutters which are motor-driven and act to shear the coarse materials collected on the drum against combs. The solids are chopped down until they can pass through the slots of the drum. Revolving and vibrating screens may also be employed as alternatives to comminuting.

Comminution is preferably carried out by a novel device to be disclosed in a subsequent section, which operates under a hydraulic head of flowing fluid, thereby dispensing with the need for power-driven grinders or shredders.

From the comminuting stage 12, the waste water is conveyed into a grit-settling stage 13. Sand, silt, grit, and other heavy inert matter in suspension find their way into the sewer system through manholes and as a result of infiltration. These materials are abrasive in nature and must be removed to prevent physical damage to mechanical equipment. Removal of grit is based on the fact that grit is heavier than organic solids and that gravitational pull will settle grit at a higher velocity than the organic material.

Grit chambers are generally constructed as fairly shallow and elongated channels that capture particles of fairly high specific gravity (i.e., 2.65). The grit particles, however, are normally coated with organic solids which reduce their apparent density and make effective separation difficult. In the present invention, acid, later produced as by-product in the negative-ion electrodialysis cells, is added to the waste water before it enters the grit chamber. The acid serves to clean the grit, as a consequence of which the grit is heavier and more readily separated.

Following grit removal, the waste water is caused to flow into a primary settling tank 14 whose preferred form is disclosed in a subsequent section. This primary or preliminary tank acts to collect much of the suspended load of impurities and to yield a fairly clarified effluent which is thereafter subjected to further treatment. At the inlet of the settling tank, chlorine, later produced as a by-product in the negative-ion cells, is added as a chemical oxidizing agent and also to assist in solids separation. Since acidification and chlorination increase particle density, the primary settling tank may have a smaller volume than conventional primary settling tanks. In practice, the settling tank may be as much as 20% to 80% smaller.

In the treatment of sewage and industrial waste water, the volume of sludge to be handled and its putrescibility, are generally so great as to require continuous sludge removal. For this purpose, scrapers or plows that move sludge may be attached to rotating arms or endless chains to withdraw the sludge which settles to the bottom of the primary settling tank. Preferably the sludge is removed continuously by an auger or screw-type device 15, which conveys it to an electrochemical cell 16 of the negative-ion isolation type, wherein the sludge is oxidized electrochemically to an inert mass which may then be dewatered to an inocuous material usable as fill or for other purposes. By-products produced in the electrochemical reactions are hypochlorous and other acids, chlorine and hydrogen, with the former two materials being utilized in the previous stages, as described hereinabove.

The fairly clarified waste-water produced in the primary settling tank, which is greatly reduced in suspended solids, is then fed into a series of negative-ion isolation cells, three of which, 17, 18 and 19, are shown. In practice, the number of ion cells or chambers actually used depends on system requirements, and as many as twenty serially-connected cells or as few as one may be employed in the negative-ion stage to attain a high level of purification.

Each negative-ion stage, as will later be described in greater detail, comprises an anode electrode surrounded by an anion-permeable membrane which is a microporous, a cathode encircling the membrane to define therewith a flow passage for the waste water being treated. When a direct-current voltage is applied between the anode and cathode, negative ions, such as chlorides, diffuse through the membrane to the anode, where they give up an electron to become a neutral atom. Some water also diffuses through the semi-permeable membrane, although water may also be added to the inner region of the membrane surrounding the anode. The addition to the water of chlorine, produces hypochlorous acid and also liberates elemental chlorine. This chlorine is used for chlorination of the treated waste water. Excess chlorine may be collected for sale or use elsewhere.

Inasmuch as disassociation of water occurs by reason of electrolysis, the hydrogen ions, which are positively charged, migrate to the cathode, and upon picking up an electron, become neutral atoms of hydrogen gas. The reduction in hydrogen ion concentration results in an increasing pH factor, as one advances from one negative-ion cell to the next. The stepwise increase in the pH factor results in fractional precipitation of positive ions, such as divalent calcium and magnesium ions.

Under the influence of the hydrogen gas evolved by electrolysis, a flotation process takes place, with precipitated solids rising and occluding within them some of the suspended material to form sludge which is then conveyed from one negative-ion cell through to the next. The rising bubbles of hydrogen also act to scavenge the surfaces of the membranes to keep them clean.

From the negative-ion chambers, the waste water intermingled with the precipitated solids, is supplied to an emulsifier stage 20. Industrial and other wastes often contain large quantities of fats and oils and though these are partially oxidized in the negative-ion chambers, large globules may escape adequate treatment and there is a need to break them up before they enter the positive-ion isolation chamber. While this may be accomplished by mechanical stirring or agitation, emulsification is preferably carried out by a novel electrochemical technique to be later described, in which the agitation is effected by a large volume of gas bubbles.

From emulsifier stage 20 the waste water is fed into a positive-ion isolation chamber 21 in which positive ions migrate through a cation-permeable membrane to a cathode, from which cathode region they may be withdrawn as a caustic solution. In the negative-ion chambers, the pH factor is increased, whereas in the positive-ion chambers, it is reduced, the arrangement being such as to return the water to a relatively neutral pH level.

Thus in the positive and negative-ion chambers, in addition to electrodialysis, which acts to demineralize and thereby remove nitrates and phosphates as well as other dissolved compounds, organics are electrochemically oxidized and these, plus precipitated inorganic material, are coagulated and flocculated by reason of the gas bubbles evolved by the electrolysis action which accompanies electrodialysis.

The next stage 22 is solids separation, which is a process that serves to remove the coagulated, suspended solids from the waste water to produce an effluent of high clarity and free of objectionable particles. Preferably, solids separation is carried out by air flotation. To this end, extremely fine air or gas bubbles are produced, which become attracted to the liquid or particles to be removed, to produce an average density of the resultant agglomerate which is below that of water, thereby causing the agglomerate to float to the surface. The consequent inert sludge is skimmed from the flotation unit and is then dewatered. Alternatively, sedimentation may be used for the same purpose. An advantage of flotation lies in the increase in dissolved oxygen, this being highly desirable when feeding an effluent into the receiving water.

The last stage is a chlorine contact tank 23, which employs chlorine generated in the negative-ion chambers, chlorine acting as an oxidizing agent and as a disinfectant of the effluent prior to its discharge into the receiving body of water. It will be appreciated that the system not only serves to remove substantially all organic matter from the waste water, but nutrients such as nitrates, as well as all other inorganic constituents, so that the water may safely be discharged into streams and lakes, or be re-used.

While there has been described a large scale sewage disposal system for municipal use, it is to be understood that the system may be simplified and scaled down for household use, in place of the existing septic tank systems which represent a serious source of pollution. The invention may be made highly compact for use in aircraft, submarines, vessels and other vehicles.

THE COMMINUTING STAGE

Referring now to FIGS. 2 and 3, there is shown a preferred embodiment in accordance with the invention, of a comminuting device 12. As pointed out previously, conventional comminuters, whether of the grinding or shredding type, are power-driven, and thereby have substantial energy requirements. Not only are motor-driven devices expensive and subject to breakdown, but the motor drive must be made reversible in order to remove obstructions which cannot be cut and which jam the device.

The comminuter shown in the drawing is driven under a hydraulic head of the flowing waste water, which 's admitted to a box-like chamber 24 through an inlet 24A. The chamber is divided by a series of equi-spaced, vertical baffles 25, into interconnecting compartments, the baffles depending downwardly from the upper wall of the box, but being spaced from the bottom wall to provide a flow passage between compartments.

Rotatably mounted within each compartment on a shaft 26, is a cutting element formed by radially-extending blades 27 which are perforated throughout. Blades 27 are formed of tool steel or other suitable metal, and are provided with cutting edges 27A which are slightly displaced at their cutting positions from the bottom wall of the chamber 24 and from the baffles 25, thereby defining nips in which coarse matter borne in the waste water is cut or ground.

The influx of water causes the blades in the first compartment to rotate in a counterclockwise direction to produce a swirling action which is transmitted to the succeeding compartment, where the blades are set into motion in a similar fashion. The comminuted waste water is discharged through an outlet 28 communicating with the last compartment. Because of the turbulence and eddies created by the rotating blades, no particular matter is permitted to settle in the comminuting box, the outflaw therefrom going into the grit chamber 13, as shown in FIG. 1.

The dimensions of the comminuter and the number of compartments and rotary blades, depend, of course, on system requirements. While the possibility exists that the comminuter will jam when the debris admitted therein cannot be cut, no stripping of gears will occur as with motor-driven devices, but the rotary blade will be arrested until the debris is removed. The comminuter is obviously far less expensive than conventional motor-driven units.

The speed of the comminuter action is a function of flow velocity and in practice, the cutting action is at a high rate which tends to beat as well as shred the debris, thereby producing fine particles. In a standard motor-driven comminuter this advantage is lacking for the cutting speed is relatively slow and independent of fluid velocity.

GRIT CHAMBER, PRIMARY SETTLING TANK, SLUDGE REMOVE AND SLUDGE TREATMENT STAGES

Referring now to FIGS. 4 and 5, there is shown a preferred form of grit chamber, generally designated by numeral 13, the chamber having a hopper-like lower section 29 from which settled grit may readily be removed. The velocity of flow is such that sand and other heavy settleable particles are deposited on the floor of the chamber, while the waste water and lighter suspended material flow through the outlet 30 of grit chamber 13 into the primary settling tank 14. The grit which settles in chamber 13 is removed periodically from outlet 29A. This tank takes the form of a rectangular box divided by baffles 31 into compartments, the upper edges of the baffles being aligned in a plane below the level of the fluid, the length of the baffles being progressively longer, so that the first compartment 14A is shallow, the second 14B is deeper and so on.

Thus waste water initially fills the several compartments in settling tank 14, a layer of waste water then flowing above the compartments to provide successive fall-out of suspended matter, the heavier particles settling out in the first compartment 14A, the lighter in the second 14B, the still lighter in the third 14C, and so on. Chlorine is supplied at the inlet of tank 14, this gas being derived from the negative-ion isolation cells. The chlorine acts not only as a chemical oxidizing agent, but it also assists in solids separation. Oxidation and solids separation are not mutually independent. In the case of septic sewage, the dispersed solids become colloidal and do not settle or separate properly. Chlorine will freshen the sewage, converting it from anaerobic to aerobic, whereby solids will then settle. It is in this sense that it assists in solids separation.

Sediment which settles at the bottom of each compartment, falls through the openings of a horizontal rack 32 into an elongated screw-type conveyor 33 which is motor-driven and acts as the sludge remover 15. The sludge is compressed, dewatered and advanced by the rotating screw toward an outlet which communicates with the input of electro-chemical cell 16.

Cell 16 is of the negative-ion isolation type, and includes a horizontally-mounted anode 34, surrounded by an anion-permeable membrane 35, supported on an insulating tube 35A, which is concentrically disposed within a tubular cathode 36 to define an annular passage 37 through which the sludge to be treated is forced toward an outlet 38. Since the operation of this cell is the same as the negative-ion isolation cells 17, 18 and 19 to be later described in detail, the operating principles thereof will be considered in the next section of the specification.

In cell 16, the sludge is oxidized electrochemically to a substantially inert mass which is then very readily dewatered to an innocuous material. By-products produced in the electrochemical reaction in the region surrounding anode 34 are hypochlorous and other acids and chlorine, which are utilized in the preceding stages for acidification and chlorination. Evolved in the sludge passage 37 is hydrogen gas, which serves to scavenge the surface of the membrane 35 to prevent fouling thereof.

NEGATIVE-ION ISOLATION ELECTRODIALYSIS CELLS

The three or more serially-connected, negative-ion isolation cells 17, 18 and 19, are all identical in construction and operation. Each cell, as shown in FIGS. 6 and 7, is constituted by a central anode electrode 39 which is of acid-resistant material, such as a carbon rod or anodic metals such as tantalum and titanium. Surrounding anode 39 and spaced therefrom to define an acid-collecting region 40, is an insulating tube 41 which may be fabricated of polyvinyl chloride or other chemically-resistant inert material having adequate structural strength such as fiber glass and ceramics. Tube 41 is provided with apertures 42 to permit the passage of ions into the anode compartment. Supported on tube 41 which is closed on both ends, is an anion-permeable membrane 43. This membrane is shorter than its supporting tube to provide clearance for sedimentation at the top and bottom thereof and to prevent short-circuiting of the electrodialysis circuit.

Concentrically disposed about membrane 43 is a tubular cathode 44, which may be fabricated of stainless steel, aluminum, or other suitable cathodic material, the space between cathode 44 and membrane 43 defining the flow passage 45 for the waste water being treated. The structure is housed within a suitable casing 46 of fiber glass or other suitable insulating material.

In practice, the waste water to be treated is introduced at the bottom of each flow passage, the waste water flowing upwardly through the passage. Thus in connecting the negative-ion isolation cells in series, the top of each flow passage is coupled by piping to the bottom of the flow passage in the next cell in the series. Operating voltage is applied across the anode and cathode by a suitable direct-current source 47 which in practice may be a storage battery or a fully rectified alternating-current supply.

In electrodialysis, the direct-current voltage impressed across the cell containing mineralized water, will cause positively-charged ions and cations to migrate through a cation-permeable membrane to the negative electrode or cathode, and negatively-charged ions or anions to migrate through an anion-permeable membrane to the positive electrode or anode. Such membranes are semi-permeable in the sense that they allow ions to pass therethrough without permitting an equivalent amount of fluid to pass. They must also be perm-selective in the sense that they are permeable to ions of one charge while being passage-resistant to ions of the opposite charge.

The perm-selectivity of the membranes arises from the fact that the electric fixed charges are bound into the micro-porous membrane structure. These charge sites repel ions of the same polarity as the fixed charge, the membrane therefore being resistant to ions of that polarity. Iions of the opposite polarity are attracted by the bound charges in the membrane, and under the influence of the impressed bias, move through the pores.

In known electrodialysis systems, cation membranes are likely to be sulfonated styrene with divinylbenzene added for cross-linking and strengthening the polymer. The positive-ion permeable membranes are often a styrene base with various amine groups being used to impart the ion-exchange property thereto. The sulfonate and amine groups make the membrane highly hydrophilic; hence the membranes absorb appreciable water when in contact with aqueous solutions.

The negative-ion permeable membrane may be made from "Amberlite" resins, by bonding together resin particles, beads or granules. The resin particles may also be polymerized together in a manner well known in the art. In the "Journal of Physical and Colloid Chemistry," vol. 54, pp. 204–226 (1950), there is contained a detailed description of the preparation and properties of perm-selective membranes in which suitably ground ion-exchange resins are embedded in a plastic matrix.

Anion and cation resins suitable for the preparation of perm-selective membranes are sold under a variety of trade names. Commercially available ion-exchange resins are listed on p. 54, in "Ion Exchange Resin," published by Wylie & Sons (1950). Suitable membranes and methods for fabricating membranes are also set forth in the Kollsman Pats. 2,854,394, Re. 25,265 and 3,271,292. In practice, rather than having a perm-selective membrane supported on an apertured tube, the structure may be constituted by perm-selective material in plug form fitted within the apertures of the tube. Or the tube itself may be fabricated of permeable material which is impregnated to render it perm-selective.

Referring now to FIG. 8, the negative-ion isolation cell is shown schematically to simplify the analysis of its operation. It will be seen that the anion-permeable membrane 43 separates the anode compartment 40 in which acid is generated, from the cathode compartment 45, wherein waste water to be treated is introduced.

It is important to note that the prototype of a standard electrodialysis device is a three-compartment electrolytic cell which, in addition to the anode and cathode compartments, includes a center compartment into which the water to be treated is fed, whereas in the present invention, the cation-permeable membrane is omitted, to form a two-compartment arrangement.

In a three-compartment prototype arrangement acting on a sodium chloride solution, chloride ions move through the anion-exchange membrane into the anode compartment, whereas sodium ions move through the cation-exchange membrane into the cathode compartment, the water of reduced salt concentration remaining in the center compartment. But in the present invention, which has only two compartments, the sodium ions are not separated from the water in the negative-ion isolation cells, but remain therein.

The migration of the chloride ions into anode compartment 40 produces, upon contact with the anode, molecular chlorine which reacts with water to produce hydrochloric and hypochlorous acid. Because of the two-compartment arrangement, the cell resistance is relatively low, since no dilute water compartment is interposed between the cathode and anode compartments. This together with an anode and cathode of dissimilar materials produces a galvanic effect, causing the cell to function as a direct-current source which reduces the current requirements for electrodialysis, for the cell to some degree supplies its own energy.

At the same time, the galvanic character of the device also promotes electrolysis, as a consequence of which the water is disassociated, oxygen being evolved in the anode compartment 40 and hydrogen in the cathode compartment 45. The hydrogen takes the form of a large volume of bubbles which percolate through the waste water and occlude to the suspended matter to effect flotation thereof. The hydrogen bubbles also sweep across the outer surface of anion-permeable membrane 43 to scavenge this surface and to prevent fouling or scaling thereof. Thus the hybrid electrodialysis-electrolysis cell is self-cleaning, thereby overcoming a problem which has heretofore beset the electrodialysis field and which has in part been responsible for its limited commercial use. The oxygen evolved in the anode compartment affords a similar scavenging action with respect to the inner surface of the membrane.

In a practical embodiment of a negative-ion isolation cell, the membrane structure is elevated slightly with respect to the bottom of the cell, the cathode 44 which surrounds the membrane structure being extended across the bottom to produce electroysis in the region as well as along the sides, whereby the resultant gas generated in the bottom region permits flotation and scavenging.

The reduction of hydrogen-ion concentration results in an increasing pH value which represents the hydrogen-ion concentration of an aqueous solution on a scale of 0 to 14, distilled water having a pH of about 7. The lower the pH value below 7, the more acid the solution, the higher the value above 7, the more basic the solution.

The positive-ion portion of the dissolved salt (e.g., calcium in calcium chloride) precipitates as the pH is increased, and since the pH value steps up in value from cell to cell in the series arrangement, these pH-sensitive positive-ion portions of the dissolved salts are increasingly precipitated therein. The organic matter in the waste water contained in the cell is oxidized by the electrochemical action, while dissolved minerals are demineralized.

Thus the waste water in compartment 45 acquires oxidized organic matter, and demineralized and precipitated material, all in a suspended state. Because of the flotation effect produced by the hydrogen bubbles, the solids, colloids and all other matter contained in the waste water are caused to rise in the compartment and are conveyed to the next negative-ion isolation cell, where the treatment is continued.

The operation of the negative-ion sludge treatment unit 16 is similar to that of the negative-ion cells described herein, except that it is an elongated, horizontal structure and acts on a relatively dense sludge rather than on fairly clarified waste water.

ELECTROLYTIC EMULSIFIER

Referring now to FIG. 9, there is shown an emulsifier having no moving parts and yet acting to break up globules emerging from the negative-ion isolation units. Such globules may be formed by reason of the previous oxidation action or by the presence of heavy fats and oils which are difficult to disintegrate.

In the emulsifier, influent from the negative-ion cells is introduced into a chamber 47 through an inlet 48. Within the chamber is mounted a horizontal cathode plate 49, which serves to divide the chamber into upper and lower regions. Vertical baffles 50 depending from the plate serve to divide the lower region into compartments which communicate with each other. The cathode is formed of a suitable material, such as stainless steel or aluminum.

Within each compartment in the lower region, is mounted a large anode block 51 which is preferably formed of carbon, the dimensions of the block being such as to form a narrow, circuitous or sinuous flow passage in each compartment, as indicated by the arrows.

Thus the waste fluid is caused to travel in a narrow, sinuous path successively through the compartments and from the last compartment to the undivided upper region of the chamber, where it is discharged through outlet pipe 52.

A direct-current voltage is applied between the anodes 51 and the common cathode 49, to cause disassociation of the water and to generate hydrogen and oxygen gas bubbles. These bubbles, which are confined within the relatively narrow flow path in the compartment between the anode and cathode, act to agitate and break up the globules and thereby emulsify the fats and other emulsifiable materials borne in the water. The gas generated promotes turbulence and prevents any material from settling in the emulsifier chamber.

In the upper region of the emulsifier, which is far less confined, the gas bubbles are liberated from the waste water and vented through a discharge pipe 53. The action of the oxygen and bubbles rising to the surface of the upper region of the chamber effects a further cleaning of the liquid being treated as the bubbles attach themselves to remaining particulate matter and sweep this matter to the surface. Moreover, the electrolytic action in the emulsifier further oxidizes the pollutants.

POSITIVE-ION ISOLATION CHAMBER

In the positive-ion isolation chamber 21, as shown in FIGS. 10, 11, 12, 13 and 14, four vertically mounted cation-permeable membranes 54, 55, 56 and 57 are mounted at spaced positions in a row within a chamber. Each membrane is supported on an insulating tube 54A, 55A, 56A and 57A, respectively, which tube is apertured to permit ion flow therethrough. As shown separately in FIG. 14, the membrane is shorter than the tube, to provide clearance for sedimentation at the top and bottom thereof and to prevent short-circuiting of the electro-dialysis circuit.

Coaxially mounted within each supported membrane is a tubular cathode 58, as shown in FIG. 12, the annular space therebetween forming a cathode compartment 59. The cathod may be formed of stainless steel, tantalum, titanium, or other metal which is resistant to caustic solutions, and in some instances aluminum may also be used where it is desirable to promote flocculation.

Disposed along the opposing sides of the chamber adjacent the row of membranes, are two parallel sets of anodes 60, 61, 62 and 63 and 64, 65, 66, 67, respectively. Mounted at the opposing ends of the chamber are anodes 68 and 69, and mounted at positions intermediate the membranes in the row are anodes 70, 71 and 72. All of the anodes are of carbon or other suitable anodic material in flat form. In practice, carbon anodes may also be placed on the bottom, or the entire box lined with anodic material.

The positive terminal of a D-C voltage source (not shown) is applied to the various anodes, and the negative terminal to the four cathodes within the membrane structure. Connection to anodes 70, 71 and 72 from the voltage source is made through a variable resistor 73 whose adjustment makes possible pH control.

Waste water is introduced into the positive-ion chamber through an inlet 74 and discharged after treatment through an outlet 75, the water flowing through the anode region surrounding the membranes. Membranes 54, 55, 56 and 57 are cation-permeable, as a consequence of which positive ions migrate therethrough to the cathode to produce a caustic solution in cathode region 59. Ions that migrate are monovalent positive ions, that is sodium, potassium and residual divalent ions, such as calcium and magnesium.

Since the negative-ion cells act to raise pH, whereas the positive-ion isolation chamber functions to diminish the pH value of the waste water being treated, the amount of decrease may be adjusted to return this value to about a neutral level. A proper balancing of these actions may be effected by feeding a controlled portion of the caustic solution into the negative-ion cells to attain a desired pH level.

In the positive-ion chamber, the disassociation of water produced by electrolysis, generates oxygen which serves to scavenge the outer surfaces of the membranes to prevent scaling and fouling. A similar action takes place in the interior through the generation of hydrogen. The oxygen bubbles occlude to the suspended matter to cause flotation thereof. To enhance flotation, one may supplement the oxygen internally generated with other gases derived from an external source.

While the positive-ion stage is illustrated as incorporating several membrane structures mounted within a common chamber, this stage may be formed by individual membrane cells, the number used in series depending on system requirements.

AIR-FLOTATION CHAMBER

Coming from the positive-ion chamber is waste water having oxidized organic matter and precipitated inorganic material in a suspended state. The purpose of the air-flotation chamber, shown in FIGS. 15 and 16, is to remove all suspended solids from the waste water in order to produce an effluent of high clarity and substantially free of all objectionable particles. In flotation, extremely fine bubbles are introduced into the chamber, the bubbles attaching themselves to the particles to be removed and causing the particles to float to the surface of the chamber to form a sludge blanket which is skimmed from the surface of the water by skimming blades or other well known means.

The most effective way of producing fine bubbles is to dissolve air in water under pressure and to reduce the pressure of the air-water mixture in the flotation chamber. In the next section, there will be described a novel device for producing a super-saturated air-water mixture or emulsion. This air-water mixture is introduced into the mixing section 76, into which the waste water to be treated is fed through an inlet 77. The reduction in pressure in mixing chamber 76 releases the air or gas content of the mixture.

Perforations 78 in mixing section 76 provide thorough dispersion of released gas or air throughout the flotation chamber 79. The air-water mixture is also introduced into a perforated sweep tube 80 at the bottom of chamber 79 to provide non-mechanical bottom cleaning.

Turbulence and velocity of flow are controlled by baffles 81, 82, 83 and 84. The placement of the baffles is such as to prevent the creation of eddy or cyclonic fluid motion. The level in chamber 79 is controlled by an adjustable weir 85 in combination with external flow-rate control. The sludge is skimmed from the upper surface of the chamber by an endless chain having flight racks or other known means (not shown), whereas the clarified effluent is conducted from the bottom through outlet 86 for further treatment, reclamation, or disposal.

Thus the purpose of the air-flotation chamber is to contain material to be treated, to control flow, to provide maximum exposure to treatment fluids, to provide maximum separation of treatment products, and to facilitate handling of treatment products.

It is to be understood that while the air-flotation unit disclosed herein is highly effective when used in conjunction with the system set forth in FIG. 1, commercially available air-flotation units or other solids separation devices may be used for the same purpose.

PRESSURE EMULSIFIER

In order to generate a super-saturated mixture of oxygen or other gas and water or other liquid, there is provided a pressure emulsifier, as shown in FIG. 17, which acts to diffuse oxygen into water to accomplish physical or mechanical flotation or chemical reactions when the resultant emulsion of liquid and gas is released into the material being treated.

In the pressure emulsifier, low-pressure liquid is fed through input line 87 into a pump 88 to produce high-pressure liquid in a feed line 89. High-pressure gas fed into an input line 90 is controlled by a regulator 91 and then fed into feed lines 92 and 93. Regulator 91 functions to regulate gas pressure to a pressure balancing the high-pressure liquid pump 88.

The regulated gas in feed line 92 is supplied to an auxiliary mixing chamber 94, where it intermingles with a high-pressure emulsion of liquid and gas introduced through a feedback line 95, the high-pressure liquid in feed line 89 being supplied to line 95. In auxiliary mixing chamber 94, the gas intermingled with the emulsion produces a highly-impregnated emulsion, the output of this mixing chamber being fed by line 96 into a main mixing chamber 97 contained within a tank.

In main mixer 96, the high-pressure emulsion introduced by line 96 is intermingled with gas taken from a gas chamber 98 supplied by feed line 93, the gas pressure therein being indicated by gauge 99. Gas from chamber 98 enters main mixer 97 through sandpipe 100, this mixer ejecting into the tank a super-saturated emulsion which remains saturated until released to a low-pressure environment in the air-flotation unit or elsewhere.

From tank 98, the emulsion is recirculated through line 101 and recirculating pump 102, which supplies feedback line 95 going into auxiliary mixer 94. In the tank, a replaceable deflector 103 at the output of main mixer 97 serves as a wearing surface, the super-saturated emulsion being discharged through outlet 104. An integral controller 105 is coupled to tank 98, hydraulic noise therefrom being minimized by a stilling baffle 106. Controller 105, which may be a simple ball float of the type used in toilets, controls liquid level in tank 98 by operating liquid feed pump 88.

Among the features of this high-pressure emulsifier are extremely fine and complete diffusion of gas and multi-stage diffusion, as well as integral control. It is to be understood that while the pressure emulsifier is intended for use in conjunction with the air-inflotation unit disclosed in the previous section, it is also useful with commercially available flotation units, or for other applications. Mainly because of multi-stage diffusion, it is possible to attain pressure as high as 150 pounds or more, which is well beyond the range of existing commercial units.

CONSTRUCTION OF MEMBRANES

Both the negative and positive-ion isolation cells make use of perm-selective membranes, one being a cation and the other an anion-permeable type. In the preferred form of membrane structures disclosed in connection with FIGS. 18 and 19, the anion and cation membranes are fabricated essentially in the same manner except that different ingredients are used to introduce fixed charges imparting the necessary negative and positive ion-exchange properties thereto.

The membrane, generally designated by letter M, is supported on a tubular base B of good insulating and structural properties and provided throughout the membrane area with apertures H to permit the passage of ions therethrough. The net area of the apertures must at least be equal to the overall area of the associated electrode. Each membrane is composed of eleven superposed layers $L_1$ to $L_{11}$, which surround the supporting tube B, some layers being in the form of woven fiber glass, and others of absorbent paper or other porous material. While an eleven-layer membrane is disclosed, it will be appreciated that the number of layers used may be chosen to meet particular design considerations.

The first tubular layer $L_1$ on the base is formed of a woven fiber glass fabric having a relatively tight mesh, so that there are as many as four hundred pores per square inch of the material. Any commercially available fiber glass fabric of good quality may be used for this purpose. Preferably the fabric is sheer, in the order of 2 or 3 mils in thickness.

To make the layer, a rectangular sheet of fiber glass fabric is wrapped about the base, the ends thereof being sealed to form a tube, and the upper and lower edges being sealed to the base B to prevent liquid leakage therethrough. Such sealing may be carried out by commercially available non-dielectric epoxy cements or other bonding agents of comparable characteristics resistant to chemical attack. Epoxy cements under the brand name of "Eder" are suitable for this purpose.

The second layer $L_2$ is also of fiber glass fabric and is applied over the first layer in the manner previously described. However, this layer is rendered anion-permeable by coating the surface thereof with a thin, microporous film of an ion-exchange resin embedded in a plastic matrix.

A coating suitable for this purpose is made by grinding "Amberlite" into a powder, the ground resin being thoroughly and uniformly dispersed in a binder solution. The preferred form of binder is a liquid epoxy, this material being made by the reaction of bis-phenol and epichlorhydrin. Epoxies are linear copolymers that are capable of cross-linking to form thermosetting resins and are characterized by toughness, flexibility and chemical resistance to a degree not found in other coating materials. Again in this instance, the epoxy must not have dielectric properties.

The epoxy solution containing the desired ion-exchange constituents may be applied by spraying or brushing, but for present purposes, a thin coating may be applied by a roller or brush to the fiber glass surface, and then permitted to dry and cure to produce an adherent film thereon. Infrared heat or circulating air may be used to accelerate this process.

In addition to the ground "Amberlite," sodium nitrate particles or particles having equivalent properties are combined with the "Amberlite" to impart anion-permeability thereto, this property arising from electric fixed charges which are bound into the membrane structure. Among other materials usable for this purpose are sodium nitrate, potassium nitrate, caustic soda or baking soda.

In practice, the epoxy binder is thinned by a volatile solvent to a low viscosity suitable for coating, and added thereto are about four ounces of powder per quart of the binder solution, the four ounces being made up of two and one-half ounces of ground "Amberlite" and one and one-half ounces of sodium nitrate or equivalent material. A hardening agent, preferably in the form of acetone is added to the solution (about 3 cc. of acetone per quart).

Wrapped about the coated fiber glass fabric layer $L_2$ is a tubular layer $L_3$ of highly absorbent paper having high wet-strength, such as "Dynel" paper, the edges thereof being sealed to the tube. Applied about paper layer $L_3$ is another layer $L_4$ of fiber glass fabric, this layer having a perm-selectable film thereon which is coated on the fiber glass surface in the manner previously described.

Applied about coated fiber glass layer $L_4$ is another paper coating $L_5$, and about that layer is a coated fiber glass fabric layer $L_6$. A paper layer $L_7$ is superposed on fabric layer $L_6$, and about paper layer $L_7$ is still another coated fiber glass layer $L_8$. This is followed by paper layer $L_9$, and by a coated fiber glass fabric layer $L_{10}$. Finally, a protective fiber glass fabric layer $L_{11}$ is applied about the coated fiber glass fabric layer $L_{10}$, Layer $L_{11}$ being uncoated.

All of the coated fiber glass fabric layers have their perm-selective films formed in the manner described in connection with layer $L_2$, and are edge-sealed to the tube to prevent edge seepage of liquid therethrough. The paper layers function as permeable spacers between the perm-selective membrane layers and permit the gas evolved in electrolysis to enter between the membrane layers to effect the necessary scavenging action. In lieu of paper layers, layers formed of thin asbestos sheeting may be used for the same purpose with excellent results.

The positive-ion membranes are made in exactly the same fashion and with an equal number of layers, except that the fixed electric charges which render these membranes cation-permeable, are introduced by adding to the ground "Amberlite," bromines or fluorides in powder form. Alternatively, hydrochloric acid may be applied to the fiber glass surface to introduce chlorides for producing the fixed charges. It is to be noted that the electric fixed charges which are bound into the microporous membrane structure must be such as to repel ions of the same polarity as the fixed charge. Hence a cation-permeable membrane has fixed charges of negative polarity bound therein to attract positive ions and to make the membrane permeable thereto.

While there has been shown and described a preferred form of electrochemical water-treatment technique and apparatus therefor, in accordance with the invention, it will be appreciated that many changes and modifications may be made therein without, however, departing from the essential spirit of the invention as defined in the annexed claims.

What I claim is:
1. A water-purification and waste-water treatment system comprising:
(a) a negative-ion isolation stage including at least one cell having an anode, an anion-permeable membrane surrounding the anode to define an anode chamber therewith and a cathode disposed about said membrane to form a cathode chamber, and means to apply a direct-current voltage across said anode and cathode to cause electrodialysis and electrolysis to take place concurrently,
(b) means to flow water to be treated through said cathode chamber to cause acid to form in said anode chamber and oxygen bubbles to be evolved therein and to cause hydrogen bubbles to be evolved in the cathode chamber, which bubbles act to scavenge the outer and inner surfaces of said membrane to prevent fouling thereof, the increase in the pH value of the water in the cathode chamber causing the positive-ion portion of dissolved salts to precipitate, organic matter suspended in said water being electrochemically oxidized,
(c) a positive-ion isolation stage including a cathode, a cation-permeable membrane surrounding said cathode to form a cathode chamber, and an anode spaced from the outer surface of said member to form an anode chamber and means to apply a direct-current voltage across said anode and cathode to cause electrodialysis and electrolysis to take place concurrently,
(d) means to conduct the water treated in said negative-ion stage to cause caustic to form in the cathode chamber thereof and to decrease the pH value of the water in said anode chamber, oxygen bubbles evolved in said anode chamber and hydrogen bubbles evolved in said cathode chamber acting to scavenge surfaces of the membrane in said positive-ion chamber to prevent fouling thereof, and
(e) means coupled to the output of said positive-ion isolation stage to separate the solids produced therein from the water to yield a clarified water effluent.

2. A system, as set forth in claim 1, wherein said separation means is constituted by an air flotation stage.

3. A system, as set forth in claim 1, wherein said positive-ion stage is constituted by a series of cells each having a cation-permeable membrane.

4. A system, as set forth in claim 1, for treating raw sewage, and further including means in advance of said negative-ion isolation stage to remove grit and other inert matter from the raw sewage to yield waste water, a settling tank, means to feed said waste water to said tank, and remover means to withdraw sludge from said tank to produce a partially clarified waste water which is then fed into said negative-ion isolation stage.

5. A system, as set forth in claim 4, further including electrochemical means coupled to said remover means to treat said sludge by the combined action of electrolysis and electrodialysis to render said sludge substantially inert.

6. A system, as set forth in claim 5, wherein said means to treat sludge is constituted by a negative-ion isolation cell having an anion-permeable membrane.

7. A system, as set forth in claim 4, wherein the gas evolved in said anode chamber of said negative-ion isolation stage is chlorine, and further including means to feed said chlorine into said settling tank.

8. A system, as set forth in claim 7, further including a chlorine-contact tank coupled to the output of said air-flotation stage, and means to feed said chlorine therein to chlorinate said clarified water effluent.

9. A system, as set forth in claim 1, further including an emulsifier stage interposed between said negative-ion isolation and said positive-ion isolation stages.

10. A system, as set forth in claim 9, wherein said emulsifier stage is constituted by a series of interconnected compartments each having a cathode and an anode and means to apply a direct-current voltage across said cathode and anode to produce electrolysis whereby the resultant gas bubbles act to break up globules of fatty matter.

11. A system, as set forth in claim 1, further including means to introduce a portion of the caustic produced in said positive-ion isolation stage into said negative-ion isolation stage to adjust the pH value thereof.

12. A treatment system for water-borne raw sewage, comprising:
(a) a screening stage having screens to strain out floating and suspended matter whose dimensions are larger than the openings of the screens to produce water-borne waste,
(b) a comminuting stage coupled to the output of the screening stage to convert the coarse matter in the water-borne waste into finer matter,
(c) a grit removal stage coupled to the output of the comminuting stage to segregate heavy, inert matter from the waste water by gravitational settling,
(d) a primary settling tank coupled to the output of the grit removal stage to collect much of the suspended load of impurities in the form of sludge and to yield a fairly clarified effluent,
(e) remover means coupled to said primary settling tank to remove the sludge therefrom,
(f) means coupled to said remover means electrochemically to treat the removed sludge to render it innocuous,
(g) a negative-ion isolation stage including at least one cell having an anode, an anion-permeable membrane surrounding the anode to define an anode chamber therewith and a cathode disposed about said membrane to form a cathode chamber, and means to apply a direct-current voltage across said anode and cathode to cause electrodialysis and electrolysis to take place concurrently,
(h) means coupled to the primary settling tank to flow the fairly clarified effluent therefrom through said cathode chamber to cause acid to form in said anode chamber and gas to be evolved therein and to cause hydrogen bubbles to be evolved in the cathode chamber which act to scavenge the outer surface of said membrane to prevent fouling thereof, the increase in the pH value of the water in the cathode chamber causing the positive-ion portion of dissolved salts to precipitate, organic matter suspended in said effluent being oxidized by ionic action,
(i) a positive-ion isolation stage including a cathode, a cation-permeable membrane surrounding said cathode to form a cathode chamber, and an anode spaced from the outer surface of said member to form an anode chamber and means to apply a direct-current voltage across said anode and cathode to cause electrodialysis and electrolysis to take place concurrently,
(j) means coupled to the negative-ion stage to conduct the water therefrom through the anode chamber of the positive-ion stage to cause caustic to form in the cathode chamber thereof and to decrease the pH value of the water in said anode chamber, oxygen bubbles evolved in said anode chamber acting to scavenge the outer surface of the membrane in said positive-ion chamber to prevent fouling thereof, and
(k) an air flotation stage coupled to the output of said positive-ion isolation stage to separate the solids produced therein from the water to yield a clarified water effluent.

13. A system as set forth in claim 12, wherein said comminuting stage is constituted by a chamber divided by a series of vertical baffles into interconnecting compartments, a cutting element being mounted for rotation in each compartment, which element is formed by radially-extending blades which are caused by the influx of water to rotate and which effect a cutting action when the edges thereof are in the proximity of the baffles.

14. A system as set forth in claim 12, wherein said sludge remover means is constituted by a conveyor screw.

15. A system, as set forth in claim 12, wherein said electrochemical means to treat the removed sludge is constituted by a negative-ion isolation device having an anode surrounded by an anion-permeable membrane, and a tubular cathode surrounding said membrane to define an annular passage for said sludge.

References Cited

UNITED STATES PATENTS

| | | | |
|---|---|---|---|
| 2,158,595 | 5/1939 | Slagle | 204—25 |
| 2,259,046 | 10/1941 | Roberts | 204—151 |
| 2,341,356 | 2/1944 | Briggs | 204—151 |
| 2,546,254 | 3/1951 | Briggs | 204—263 |
| 2,593,915 | 4/1952 | Pavelka | 204—301 |
| 2,816,862 | 12/1957 | Marchand | 204—301 |
| 2,997,430 | 8/1961 | Foyn | 204—151 |

TA-HSUNG TUNG, Primary Examiner

A. C. PRESCOTT, Assistant Examiner

U.S. Cl. X.R.

204—151, 301

PO-1050
(5/69)

UNITED STATES PATENT OFFICE
CERTIFICATE OF CORRECTION

Patent No. 3,562,137               Dated     February 9, 1971

Inventor(s)    Newton P. Gehring

It is certified that error appears in the above-identified patent and that said Letters Patent are hereby corrected as shown below:

Claim 1, clause d , second line of the clause, the following phrase has been omitted :

"through the anode chamber of
the positive-ion stage"

Signed and sealed this 1st day of June 1971.

(SEAL)
Attest:

EDWARD M. FLETCHER, JR.            WILLIAM E. SCHUYLER, JR.
Attesting Officer                  Commissioner of Patents